(12) United States Patent
Becher et al.

(10) Patent No.: US 7,092,340 B2
(45) Date of Patent: *Aug. 15, 2006

(54) PLAYBACK APPARATUS

(75) Inventors: Juergen Becher, Emmendingen (DE); Dieter Bächer, Sexau (DE); Juergen Meiner, Freiburg (DE)

(73) Assignee: Micronas GmbH, Freiburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,150

(22) Filed: Feb. 4, 2004

(65) Prior Publication Data

US 2005/0018577 A1    Jan. 27, 2005

Related U.S. Application Data

(63) Continuation of application No. 09/615,617, filed on Jul. 13, 2000, now Pat. No. 6,788,634.

(51) Int. Cl.
*G11B 5/09* (2006.01)

(52) U.S. Cl. ............... 369/59.23; 369/47.19; 369/47.15; 369/47.32

(58) Field of Classification Search .......... None
See application file for complete search history.

(56) References Cited

U.S. PATENT DOCUMENTS

| 4,348,699 A | 9/1982 | Tsuchiya et al. ............. 360/32 |
| 4,612,453 A | 9/1986 | Yamazaki ..................... 307/303 |
| 4,893,193 A | 1/1990 | Nakamura et al. ........... 358/341 |
| 5,197,297 A | 3/1993 | Brendal et al. ................. 62/81 |
| 5,237,460 A | 8/1993 | Miller et al. ..................... 360/8 |
| 5,243,236 A | 9/1993 | McDaniel ..................... 307/443 |
| 5,428,593 A | 6/1995 | Kanai et al. .................... 369/59 |
| 5,473,253 A | 12/1995 | Araki .......................... 324/537 |
| 5,473,326 A | 12/1995 | Harrington et al. ............. 341/51 |
| 5,490,260 A | 2/1996 | Miller et al. .................. 395/427 |
| 5,539,716 A | 7/1996 | Furuhashi ....................... 369/59 |
| 5,587,978 A | 12/1996 | Endo et al. ..................... 369/32 |
| 5,627,995 A | 5/1997 | Miller et al. ............. 395/497.02 |
| 5,684,763 A | 11/1997 | Kurita et al. .................. 369/13 |
| 5,737,308 A | 4/1998 | Nakai et al. .............. 369/275.2 |
| 5,832,085 A | 11/1998 | Inoue et al. ................... 380/10 |
| 5,894,480 A | 4/1999 | Hoffert et al. ............... 370/389 |
| 5,902,115 A | 5/1999 | Katayama .................... 434/307 |
| 6,038,208 A | 3/2000 | Shikunami et al. ....... 369/275.3 |
| 6,151,580 A | 11/2000 | Bächer et al. ............... 704/500 |
| 6,788,634 B1 * | 9/2004 | Becher et al. .............. 369/59.1 |

FOREIGN PATENT DOCUMENTS

| JP | 09320194 | 12/1997 | ..................... 20/10 |
| JP | 10079166 | 3/1998 | ..................... 20/10 |

* cited by examiner

*Primary Examiner*—Muhammad Edun
(74) *Attorney, Agent, or Firm*—O'Shea, Getz & Kosakowski, P.C.

(57) ABSTRACT

A playback apparatus includes a data source (1) that provides a data stream signal (d0), and a device (2) responsive to the data stream signal. The device forms a first data stream (d1) in a first data format (F1), wherein the first data stream (d1) includes a data field (D1) that is encoded in a second data format (F2). A code converter (3) is responsive to the first data stream (d1), and converts selected parts of the first data stream (d1) to a second data stream (d2) that has data encoded in a third data format (F3). An output decoder (5) forms playback signals from the second data stream (d2). The playback signal may be audio and/or video signals that are presented to the appropriate audio transducer or display device for presentation to a playback apparatus user(s).

24 Claims, 2 Drawing Sheets ns of a PLAYBACK APPARATUS

CROSS REFERNCE TO RELATED APPLICATIONS

This application is a continuation of co-pending application Ser. No. 09/615,617 filed Jul. 13, 2000 now U.S. Pat. No. 6,788,634 and entitled "Playback Apparatus".

BACKGROUND OF THE INVENTION

This present invention relates to the field of audio/video playback devices and in particular, to a playback device that supports playing back data that is encoded in more than one format.

A playback apparatus receives from a data source that delivers audio and/or video data. The data source may be of very different nature; for example, it may be hidden behind a data interface if the data are received from the Internet or another data network via a personal computer (PC). Other examples of such data sources are compact data storage in which the data are stored (e.g., magnetically, optically, electronically, or on another principle) and converted during readout into an electronic data stream by suitable devices. Also suitable for use as compact data sources are solid-state memories, because such memories do not require a mechanical drive.

Data from the data source is converted to an error corrected data stream, and fed to an output decoder that separates the data stream into the respective signal components and, if necessary, converts the latter from digital to analog form. These signal components are then fed to a playback transducer (e.g., headphones, loudspeakers, etc.). In the case of video signals, the playback transducer may be a television receiver, a multimedia apparatus, or a simple video display on the playback apparatus.

CDs are reasonably priced devices for storing audio data, and have the benefit of being rewriteable (i.e., CD-RW). The original data is frequently streamed from the Internet. To permit the use of commercially available audio playback apparatus, the data must be stored according to submitted standards, for example according to the "Sony-Philips Red/Blue Book".

The transmission, storage, and reproduction of data, particularly of audio data, in accordance with these standardized data formats is very common. However, it has the disadvantage that these standardized data formats frequently do not provide for data compression or only provide for relatively little data compression, so that they do not make optimum use of the existing storage space. On the other hand, there are techniques in which the level of compression can be chosen in a wide range. Pure voice applications allow a higher compression level than high-quality music reproduction. Such compression and coding techniques are known, for example, by the acronym "MPEG", and are used, for example, in the optical storage of video and audio signals for a DVD system. It is desirable to take advantage of these data compression techniques, while retaining the proven recording, storage, and playback system as far as possible. In particular, a playback apparatus is desirable that is suitable for the reproduction of at least one improved data format and conventional or mixed data formats.

SUMMARY OF THE INVENTION

An object of the present invention is provide a playback apparatus that processes data from data sources with at least one specific code that is different from the conventional code, while retaining many conventional components.

Additional objects include providing a suitable storage device, a suitable data format, and a programming device adapted to the data format.

A playback apparatus of the present invention includes a code converter that is coupled to a data source. This code converter converts the data stream of this device, whose data format cannot be decoded by a conventional decoder. The code converter provides a data format that is processed by an output decoder to form playback signals. The code converter does not have to convert all of the data from the data source; it suffices that it convert particular portions of the received data stream into a form suitable for deriving the playback signals.

If the playback apparatus recognizes and processes two or more data formats, it is desirable to provide in parallel signal path to the code converter that includes a buffer. Without temporal compensation, in case of a switchover, the data routed directly to the output decoder would not fit in with the data passed through the code converter. As a result, without temporal compensation during a transitional period the output decoder may provide erroneous playback signals.

Control of the signal paths for the output decoder can be implemented simply by switching the signal paths manually. A more convenient control technique is an electronically activatable control unit that identifies particular data formats with a detector circuit and then effects the switchover automatically.

For consumer applications, compact, exchangeable storage devices are required as transportable data sources. Optical and magnetic storage devices generally require a mechanical drive, and thus a motor controller, with which the read rate is adapted to the respective data format. An error-detecting device is incorporated, and during the occurrence of errors in one of the data streams the error detecting device generates an error signal that disables the output decoder for at least the duration of the disturbance.

To achieve as uniform a data stream as possible (e.g., to compensate for a non-uniform read operation or to compensate for packet data formats containing a further data format in an interleaved form) buffers may be provided for the respective data stream.

If two or more data formats are identified and processed, it may be permissible, for example, that the recorded data is compressed in whole or in part. This increases the flexibility of the entire playback system. Whether the uncompressed and/or compressed data correspond to a standardized data format is important only inasmuch as the data formats must be adapted to the output decoder or the code converter. This requires, of course, that this be taken into account already during the recording of the data. Suitable programming or write devices, also known for compact disks by the term "burners", must define these readable data formats for the data to be stored.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
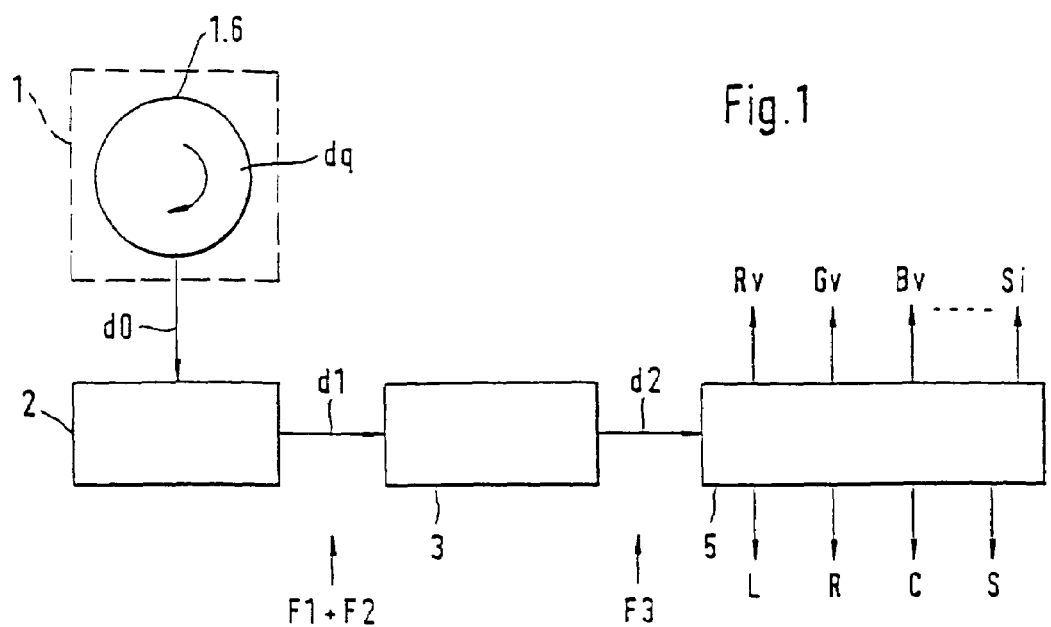
FIG. 1 is a schematic block diagram of a first embodiment.

FIG. 1 is a block diagram illustration of a first embodiment of a playback apparatus according to the present invention. A data source 1 provides an input data stream d0 to a device 2 (e.g., an input decoder or a reader) that receives data from a storage device 1.6 contained in the data source 1. In one embodiment the storage device 1.6 includes a mechanically driven compact disk on which data dq is stored in an optically readable form.

The device 2 provides a first data stream d1, which is error-corrected as compared to the input data stream d0 and, for example in a conventional CD player, is fed directly to an output decoder 5 that derives the analog right and left signals (R, L) from the data stream d1. In the embodiment of FIG. 1, three data formats F1, F2, F3 are given, of which the first and third data formats F1, F3 may also be identical. The first data stream d1 contains in its first data format F1, in interleaved form, the second data format F2, which, however, cannot be processed by the output decoder 5. The output decoder 5 may be limited to audio signals; this depends on the respective range of tasks to be performed by the playback apparatus. The representation of FIG. 1 is not only intended to stand for the playback of audio signals, but also is to show the suitability for playback signals from the video range. The left signal L, the right signal R, the center signal C, and the surround signal S stand for the audio range, and the three analog color signals Rv, Gv, Bv and possible further signals Si stand for the video range.

A code converter 3 expands the compressed data of the second data format F2 and forms the third data format F3 therefrom. If the first data stream d1 contains only uncompressed data of the format F1, meaningful playback signals are obtained only if the code converter 3 is switched to a transparent state. How this can be done automatically or manually is shown in the embodiment of FIG. 2.

Figure 2:
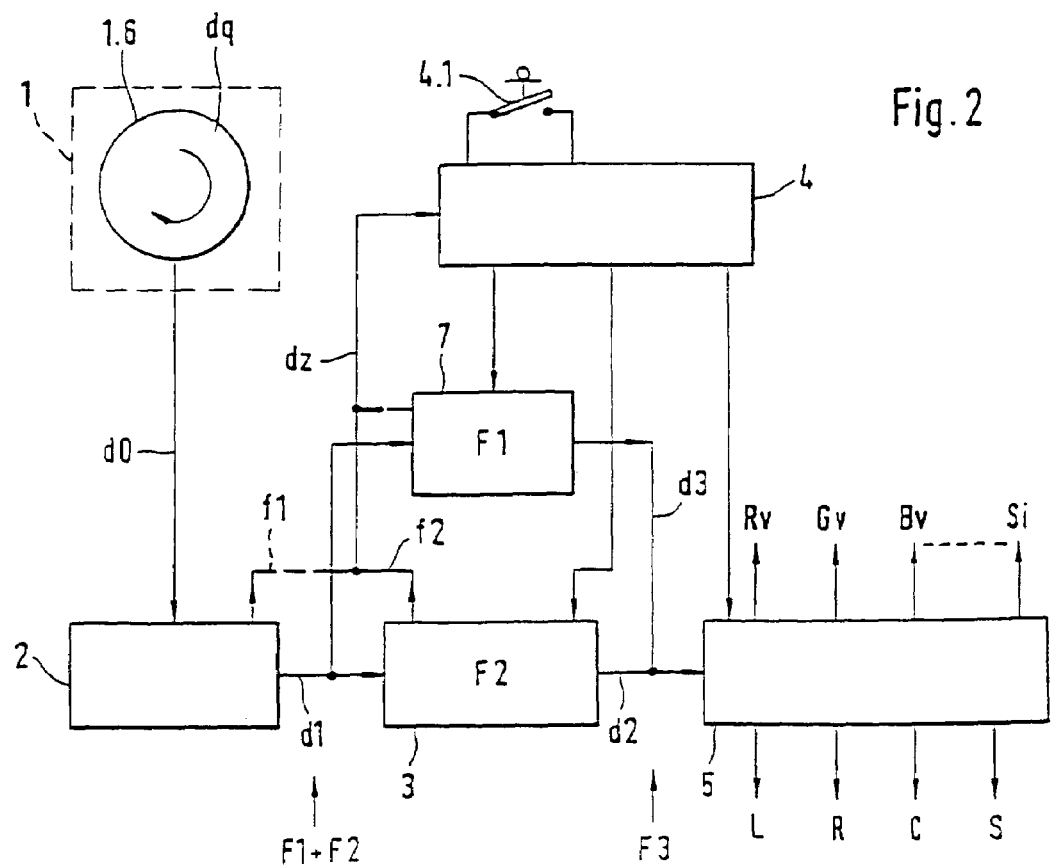
FIG. 2 is a schematic block diagram of a second embodiment.

FIG. 2 is a block diagram illustration of a second embodiment of the invention. Similar functional units in the different embodiments are designated by the same alphanumeric reference. As in FIG. 1, the data source 1, the device 2, the code converter 3, and the output decoder 5 of FIG. 2 are present as basic components. To these have been added a control unit 4 and a buffer 7. The buffer 7 effects the "transparence" of the code converter 3, because via this buffer the data stream d1 bypasses the code converter 3 and is applied as a data stream d3 to the input of the output decoder 5. If the buffer 7 only serves to provide temporal compensation, the data stream d3 is only shifted in time with respect to the data stream d1 and, if necessary, freed from data rate fluctuations. The buffer 7 may additionally perform a code conversion like the code converter 3, whereby the number of processable data formats is increased.

In the embodiment of FIG. 2, the code converter 3 and the buffer 7 are jointly connected to the data input of the output decoder 5. To prevent any conflict between data streams d2, d3, the data output of the code converter 3 or of the buffer 7 is enabled or disabled by the control unit 4. The disabling is effected by the undecided state in the tri-state mode. A detector circuit 2, 3, 7 (not shown in detail) generates a detection signal d7 for the respective data format F1, F2, which acts on the control unit 4. A manual operating facility 4.1 may replace or supplement the detector circuit 2, 3, 7. During the switching time, the output decoder 5 is disabled for at least as long as erroneous playback signals occur.

Figure 3:
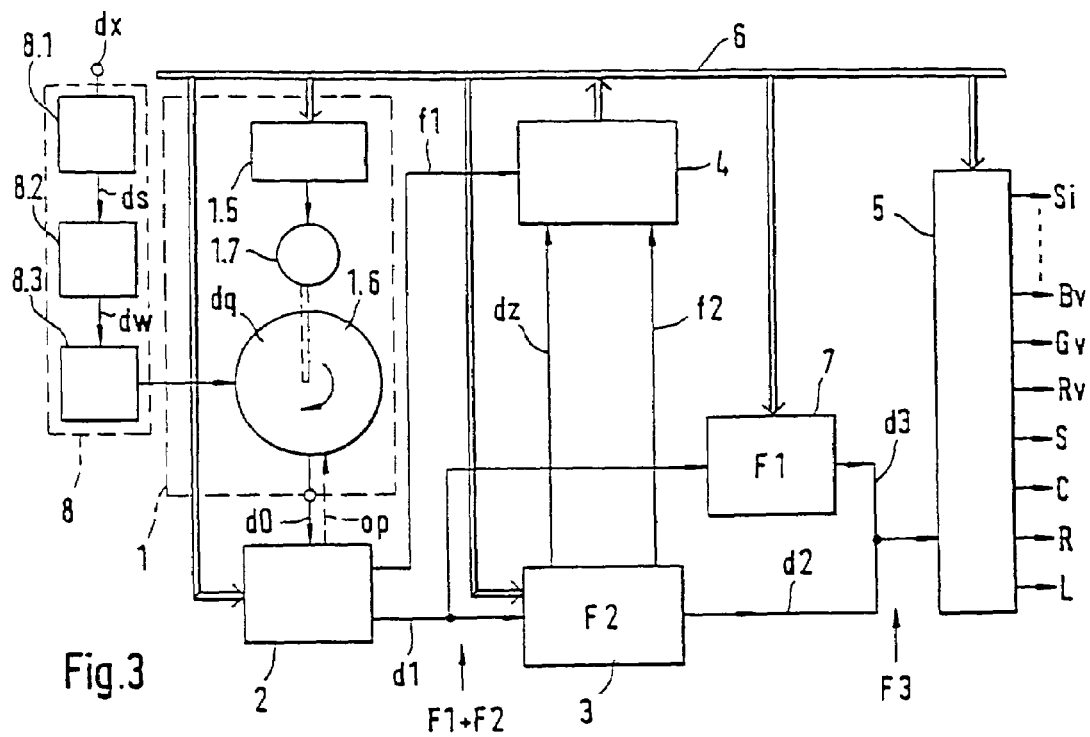
FIG. 3 is a schematic block diagram of a third embodiment.

FIG. 3 illustrates a third embodiment of the playback apparatus, which illustrates a portion of the data source 1 in some more detail. As shown, the data source 1 includes a driving element that drives the storage device 1.6 when it is not a compact solid-state memory, but rather a rotating CD. The speed of the drive motor 1.7 for the CD is controlled by a motor controller 1.7. In the case of a compressed data format F2, the data rate of the input data stream d0 can be reduced approximately by the compression factor of the data format F2 with respect to the standard data format F1. Via corresponding control information that is transferred over a control bus 6, the motor controller 1.5, and thus the drive motor 1.7, is set to this speed value. A laser beam op emitted by the device 2 generates from the stored data dq the optical input data stream d0 with the desired data rate.

FIG. 3 also illustrates a programming device 8 with which the interleaved data format can be written on the storage device 1.6. The programming device 8 includes in the direction of signal flow, a first and a second encoding device 8.1, 8.2 and a write device 8.3. The second encoding device 8.2 and the write device 8.3 correspond to the functional blocks of commercially available programming devices for the standardized data format F1, which are known for CDs by the term "burners". However, according to an aspect of the invention, the data to be stored dx is first converted by the first encoding device 8.1 to the second data format F2 to form a data stream ds that is converted by the second encoding device 8.2 to the first data format F1. The resulting data stream dw thus corresponds to the standardized data format F1, whose data stream is written on the storage device 1.6 by the write device 8.3.

In the embodiment of FIG. 3, control of the playback apparatus is effected via the control bus 6, which is coupled to the control unit 4 on the instruction side. The individual control instructions and control addresses are stored in this control unit, and are activated via a logic or evaluation device by the signals f1, f2, dz.

Figure 4:
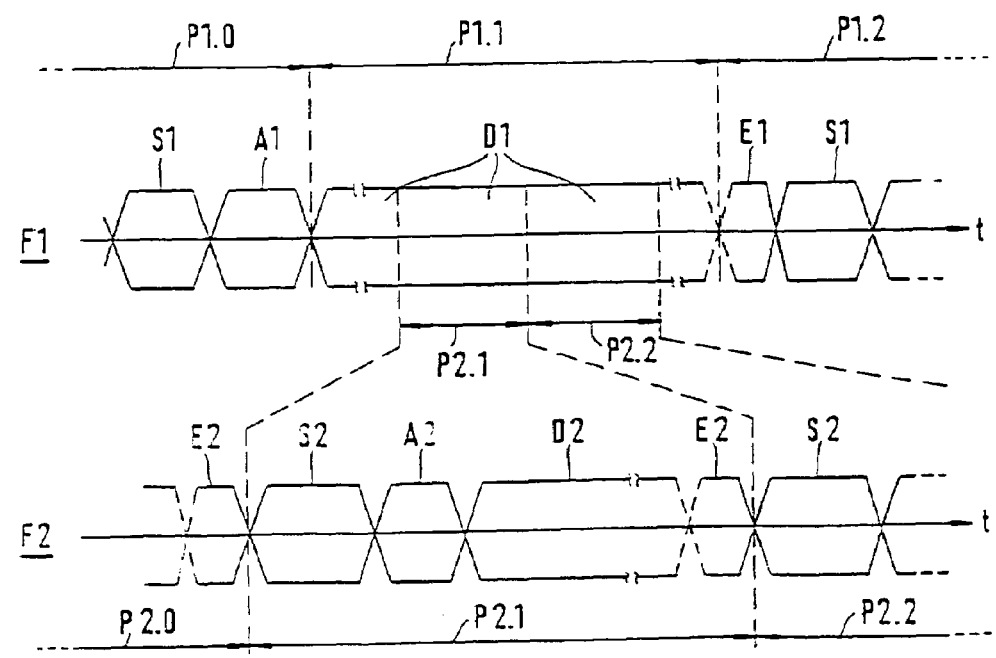
FIG. 4 is a time diagram of an interleaved data format.

In FIG. 4, the scheme of the interleaved data formats is illustrated by two time diagrams. The first data format F1, which is usually standardized, is transmitted in successive data packets P1.0, P1.1, P1.2. Each data packet contains a sync field S1 for synchronizing the data packets at the receiving end, an auxiliary-data field A1 (which may contain information on the respective data standard, the length of the data format, or other information), and the data field D1 containing the data along with an error-correcting code. Each data packet also includes an end field E1 that signals the end of the respective data format and data packet. This basic data structure, of course, permits deviations in the type and length of the individual blocks etc. Additional fields may be provided, or other fields recur. The subsequent data packet P1.2 contains the same fields (i.e., the sync field S1, the auxiliary-data field A1, etc.)

The second data format F2, which may be standardized and contains data in compressed form, does not basically differ from the first data format F1. Sync information S2 is followed by auxiliary data A2, which in the case of the MPEG standard, for example, defines the respective compression factor of the information contained in data field D2. Here, too, the length of the data packets is specified either in the auxiliary-data field A2 or by the end information E2. The data packet P2.1 is followed by the new data packet P2.2, which has the same structure. The time axis t in the representation of the data format F2 is extended in comparison with that of the representation of the data format F1. The information as to which of the data formats F1, F2 is being received is determined by the aforementioned detector circuit 2, 3, 7 from the sync field S1 and/or the auxiliary-data field A1. The detector circuit includes a coincidence detector that monitors the first, second and third data streams d1, d2, d3 as to whether the identifying data sequence occurs therein. If that is the case, the associated detection signal dz is formed for the control unit 4, which initiates the further switching operations.

Although the present invention has been shown and described with respect to several preferred embodiments thereof, various changes, omissions and additions to the form and detail thereof, may be made therein, without departing from the spirit and scope of the invention.

What is claimed is:

1. A playback apparatus, comprising:
   a data source that provides a data stream signal;
   a device that is responsive to said data stream signal and forms a first data stream in a first data format, wherein said first data stream includes a data field in a second data format;
   a code converter that is responsive to said first data stream, and converts selected parts of said first data stream in the second data format to a second data stream having data encoded in a third data format; and
   an output decoder for selectively forming playback signals from the second data stream and a time delayed version of said first data stream.

2. The playback apparatus of claim 1, further comprising:
   a buffer responsive to said first data stream that provides to said output decoder a third data stream indicative of said time delayed version of said first data stream whose data format corresponds to said third data format.

3. The playback apparatus of claim 2, wherein said second and third data streams are selectively applied to said output decoder by a control unit.

4. The playback apparatus of claim 3, wherein said code converter provides a detection signal (dz) to said control unit indicative of the presence of said first data format and/or said second data format, and said control unit determines whether to provide said second data stream or said third data stream to said output decoder in response thereto.

5. The playback apparatus of claim 4, wherein said data source comprises a storage device that can be exchangeable/removable from said playback apparatus.

6. The playback apparatus of claim 5, wherein said storage device is at least partially mechanically driven.

7. The playback apparatus of claim 6, wherein said control unit changes the read rate of said storage device in response to the detection signal (dz).

8. The playback apparatus of claim 7, Wherein the read rate of said storage device is dependent upon speed of a motor that is regulated at a predetermined value by said control unit via a motor controller.

9. The playback apparatus of claim 5, wherein said device comprises means for detecting an error in said input data stream and for providing a first error signal indicative thereof, said code converter comprises means for detecting an error in said first and second data streams and generating an second error signal indicative thereof, wherein said first and second errors signal are provided to said output decoder.

10. The playback apparatus of claim 5, wherein said storage device contains data assigned to a first data format, and that at least one data field of successive data packets of the first data format contains data packets of the second data format, whose contents correspond to the information to be reproduced.

11. The playback apparatus of claim 10, further comprising:
   a programming device that first converts data of the information to be stored to the second data format and provides a resulting data sequence that is then converted to the first data format to provide a data sequence that is written to said storage device to form stored data resident on said storage device.

12. The playback apparatus of claim 2, wherein said buffer provides temporal compensation between said second and third data streams.

13. The playback apparatus of claim 2, further comprising a manually controlled switch, wherein said second and third data streams are selectively applied to said output decoder by said manually controlled switch.

14. The playback apparatus of claim 1, comprising means responsive to said first data stream for providing said time delayed version of said first data stream.

15. The playback apparatus of claim 1, wherein said code converter comprises a decoder that decompresses the selected parts of said first data stream in the second data format to provide said second data stream.

16. The playback apparatus of claim 1, wherein said code converter comprises means for decompressing MPEG encoded audio.

17. A playback apparatus that is responsive to a data stream signal provided by a data source, said playback apparatus comprising:
   means responsive to said data stream signal, for forming a first data stream in a first data format wherein said first data stream includes a data field in a second data format;
   a code converter that is responsive to said first data stream, and converts selected parts of said first data stream in the second data format to a second data stream having data encoded in a third data format; and
   an output decoder for selectively forming playback signals from said second data stream and a time delayed version of said first data signal.

18. An audio playback apparatus that provides an audio playback signal to an audio transducer, said audio playback apparatus comprising:
   a device that is responsive to an encoded data stream signal and forms a first data stream in a first data format, wherein said first data stream includes a data field in a second data format;
   a code converter that is responsive to said first data stream, and converts selected parts of said first data stream in the second data format to a second data stream having data encoded in a third data format;
   a buffer responsive to said first data stream and located electrically parallel to said code converter, that provides to said output decoder a third data stream whose data format corresponds to said third data format;
   an output decoder for generating the audio playback signals; and
   means for selectively applying one of said second data stream and said third data stream to said output decoder to form the audio playback signals that are output to the audio transducer.

19. A playback apparatus, comprising:
- a device that is responsive to a data stream signal and forms a first data stream in a first data format, wherein said first data stream includes a data field in a second data format;
- an expander that is responsive to said first data stream, and based upon a compression factor in an auxiliary data field of the first data stream said expander expands said data field of said first data stream in the second data format to a second data stream having data encoded in a third data format; and
- an output decoder for selectively forming playback signals from the second data stream and said first data stream which are selectively decoded by said output decoder under the control of a control unit.

20. The playback apparatus of claim 19, wherein said expander comprises means for decompressing MPEG encoded audio.

21. A playback apparatus, comprising:
- a code converter that receives a first data stream in a first data format, wherein said first data stream (i) includes a data field in a second data format (ii), a sync field and (iii) an auxiliary data field, wherein said code converter converts said data field to a second data stream having data in a third data format based upon information located in the auxiliary data field; and
- an output decoder for selectively forming playback signals from said second data stream and said first data stream.

22. The playback apparatus of claim 21, wherein said converter converts said data field to said second data stream based upon compression information located in the auxiliary data field.

23. The playback apparatus of claim 22, wherein said compression information is indicative of an MPEG audio compression factor.

24. The playback apparatus of claim 21, where said playback signals include audio signals.

* * * * *

UNITED STATES PATENT AND TRADEMARK OFFICE
CERTIFICATE OF CORRECTION

| | |
|---|---|
| PATENT NO. | : 7,092,340 B2 |
| APPLICATION NO. | : 10/772150 |
| DATED | : August 15, 2006 |
| INVENTOR(S) | : Becher et al. |

It is certified that error appears in the above-identified patent and that said Letters Patent is hereby corrected as shown below:

Column 1
line 16, after "receives" insert --data--
line 18, before "different" delete "very"
line 20, before "another" insert --from--

Column 2
Line 17, before "parallel" delete "in" and insert --a--

Column 3
Line 65, delete "d7" and insert --dz--

Column 5
In the claims, claim 8, line 54, delete "Wherein" and insert --wherein--

Column 7
In the claims, claim 21, line 21, delete "(i) includes" and insert --includes (i)--

Column 8
In the claims, claim 21, line 1, delete "format (ii)," and insert --format, (ii)--

Signed and Sealed this

Fourteenth Day of November, 2006

JON W. DUDAS
*Director of the United States Patent and Trademark Office*